United States Patent [19]

Batchelor et al.

[11] 4,204,029
[45] May 20, 1980

[54] MANUFACTURED GLASS LAMINATES

[75] Inventors: Robert L. Batchelor, Orange, Tex.; Charles F. Feldman, Fresno, Calif.

[73] Assignee: Gulf Oil Corporation, Pittsburgh, Pa.

[21] Appl. No.: 753,124

[22] Filed: Dec. 22, 1976

Related U.S. Application Data

[63] Continuation of Ser. No. 252,934, May 12, 1972, abandoned, which is a continuation of Ser. No. 64,056, Jul. 23, 1970, abandoned, which is a continuation of Ser. No. 516,752, Dec. 27, 1965, abandoned.

[51] Int. Cl.$^2$ ....................... B32B 17/10; B32B 31/00
[52] U.S. Cl. ..................... 428/441; 156/106; 428/442
[58] Field of Search ............... 260/29.6 PM; 428/437, 428/441, 442; 156/106

[56] References Cited

U.S. PATENT DOCUMENTS

| 2,400,139 | 5/1946 | Roland | 428/441 |
| 2,946,711 | 7/1960 | Bragaw et al. | 428/437 |
| 3,344,014 | 9/1967 | Rees | 428/441 |
| 3,475,267 | 10/1969 | Miles | 428/441 |
| 3,485,785 | 12/1969 | Anspon | 260/29.6 PM |

Primary Examiner—William J. Van Balen
Attorney, Agent, or Firm—Richard L. Kelly

[57] ABSTRACT

Laminated glass structures are prepared by bonding together at least two glass sheets with an ethylene polymer containing substituent carboxylic groups and, optionally, amide and/or ester groups.

13 Claims, No Drawings

MANUFACTURED GLASS LAMINATES

REFERENCE TO RELATED APPLICATIONS

This application is a continuation of our earlier-filed application Ser. No. 252,934, filed on May 12, 1972, now abandoned, which, in turn, is a continuation of our earlier-filed application Ser. No. 64,056, filed on July 23, 1970, now abandoned, which, in turn, is a continuation of our earlier-filed application Ser. No. 516,752, filed on Dec. 27, 1965, now abandoned.

This invention relates to certain laminated glass manufactured structures. In another aspect, this invention relates to such laminated structures in which the coating or the binding layer of the laminated structures consists of ethylene polymers containing therein carboxylate groups and optionally amide and/or ester groups.

It is an object of this invention to provide laminated glass structures in which at least two of the glass laminae are bonded together with an ethylene polymer of a particular type as subsequently described.

Another object of this invention is to provide a process for preparing novel laminated glass structures as above described.

Other objects, advantages, and features of this invention will be readily apparent to those skilled in the art from the following description and appended claims.

The above and related objects are attained by bonding together at least two glass lamina with an ethylene polymer containing along its polymer chain caboxylate groups (which may be in a free acid or a salt form), optionally pendant amide groups and optionally pendant ester groups, all within molar ratios as subsequently described. For convenience and brevity of expression in the following descriptions of the invention, such polymers frequently will be referred to simply as Ethylene Polymers.

Glass, as the term is herein conventionally employed, includes supercooled liquids of high viscosity comprising solid solutions of fused silicates of varying composition. Glass as employed in the practice of this invention includes plate glass, sheet glass, and and glass articles of manufacture molded into a variety of shapes and forms. The invention has been found to be particularly applicable in the preparation of automobile safety glass as subsequently described.

The Ethylene Polymers employed as the coating or bonding agent in the present invention are described in U.S. Pat. No. 3,485,785 (assigned to the assignee of the present application) and that description is incorporated herein by reference. Such Ethylene Polymers contain pendant carboxylate groups along the polymer chain. Preferably the Ethylene Polymers also will contain pendant amide groups. Optionally, the Ethylene Polymers also may contain pendant ester groups.

The structure of the Ethylene Polymers can be represented as containing groups of the structures:

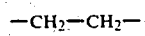   (a)

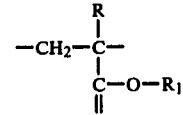

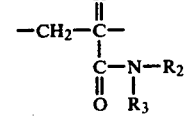

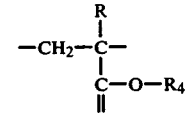

wherein R is selected from the group consisting of hydrogen and alkyl groups, $R_1$ is selected from the group consisting of hydrogen and cations, $R_2$ and $R_3$ are independently selected from the group consisting of hydrogen, hydroxyalkyl and hydrocarbon groups with the further provisions that $R_2$ and $R_3$ may be combined with N in a heterocyclic group, and $R_4$ is a hydrocarbon group. $R_1$ typically may be a sodium; potassium; lithium; ammonium; substituted ammonium or a quaternary ammonium ion. $R_1$ may also be multivalent cation, as, for example, magnesium, calcium or aluminum. $R_2$, $R_3$ and $R_4$ typically may be alkyl groups, e.g., methyl, ethyl, butyl, etc.; aryl group, e.g., phenyl, naphthyl, tolyl, etc.; alkenyl groups such as allyl; hydroxyalkyl, e.g., hydroxyethyl and hydroxypropyl; and aralkyl, e.g., benzyl. Examples of $R_2$ and $R_3$ being combined with the nitrogen in a heterocyclic group include the amides prepared from piperidine, morpholine, pyrrolidine, etc.

The groups of the formulae (b), (c), and (d) are present in a ratio of from about 0.01 to about 0.50 mol per mol of group (a). The ratio of the groups is selected so that the Ethylene Polymer will be soluble or at least colloidally dispersable at 50° C. in water when the groups of formula (b) are in salt form.

In the Ethylene Polymers of maximum utility for the present invention, the groups of the formulae (b), (c) and (d) will be present in the ratio of about 0.025 to about 0.25 mol per mol of group (a) and more especially in a ratio of from about 0.04 to 0.15 mol per mol of group (a).

The groups of the formulae (b), (c) and (d) may consist of 100% of group (b) although ordinarily such groups will constitute 10–95 mol % and more especially 20–80 mol % of the total of (b), (c) and (d). Groups of the formula (c) may constitute about 90 mol % although ordinarily such groups will constitute 5–90 mol % and more especially 5–70 mol % of the total of (b), (c) and (d). Groups of the formula (d) may constitute up to about 85 mol % of the total of (a), (b) and (c), although ordinarily they will not constitute in excess of about 20 mol % of the total of (b), (c) and (d).

The preferred Ethylene Polymer will contain both carboxylate groups (preferably in sodium or potassium salt form) and amide groups and may be represented by the formula:

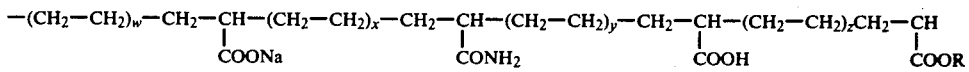

where w, x, y, and z can be branched.

The Ethylene Polymers can be prepared by hydrolyzing a copolymer of ethylene with an ester of acrylic or an alpha-substituted acrylic acid in the presence of a strong base such as an alkali metal hydroxide or a quaternary ammonium hydroxide and optionally ammonia or an amine. The hydrolysis can be run at elevated temperatures of 180° C. or even higher. It is desirable to provide agitation as the ethylene-acrylate ester copolymer originally charged to the hydrolysis reaction is insoluble in the liquid hydrolysis medium. The quantity of strong base which is employed is that required to convert the desired number of ester groups to the salt form. The ammonia or amine (if used) is employed preferably in excess of that stoichiometrically required to convert the acrylate ester groups to amide or substituted amide groups.

The Ethylene Polymers as prepared by the process described above are obtained directly in the form of aqueous dispersion which are suitable for use as coating compositions. If desired, the polymer solids can be recovered by drying or coagulating the polymer dispersion with acids. The recovered polymer solids can be employed in the form of dry powder, or may be compression molded or extruded. They may also be redispersed by heating with agitation in water containing sufficient alkali to effect conversion of carboxy groups to the salt form. Alternatively, the Ethylene Polymer solids can be dissolved in suitable organic solvents such as xylene-acetic acid, toluene-isopropanol, toluene-2-butanone, and xylene-m-cresol.

If desired, pigments, fillers, and/or other polymers can be incorporated into the Ethylene Polymer coating solutions or dispersions before use. Minor quantities of surfactants and/or organic solvents can also be incorporated into the aqueous coating compositions.

If desired, the polymers may be coagulated by addition of salts of polyvalent metals, or by use of concentrations of alkali metal hydroxides which are near the saturation point. In the latter instance, the polymer solids may be recovered by filtration and drying to yield a powder which is readily dispersible in plain water.

The laminates of the invention consist of two or more glass laminae which are bonded together with an Ethylene Polymer. A particularly useful glass laminate which can be prepared by the process of this invention is the laminated safety glass employed in windshields of automobiles.

The laminated glass structures can be prepared, for example, by laying down an aqueous dispersion of the Ethylene Polymer on one glass lamina, evaporating the water therefrom, subsequently placing the coated glass lamina against a second glass lamina (which also may be coated with an Ethylene Polymer) and heating under at least light pressure. Alternatively, an organic solvent solution of the Ethylene Polymer can be laid down on the glass surface and the solvent evaporated therefrom. When employing an aqueous dispersion of the Ethylene Polymer as the coating composition, it is frequently desirable to incorporate therein a small quantity of a water-miscible organic solvent or a surfactant to improve the spreadability of the aqueous dispersion on the surfaces of the glass substrates. Alcohols, glycols, aldehydes, amines, and amino alcohols can be used for this purpose. Where it is desired to have a continuous fused film of the Ethylene Polymer on the glass lamina, the coated glass article should be heated to at least 60° C. and preferably to at least 100° C. It is not essential, however, to prepare a coated lamina first, as it is feasible to simply distribute solid particles of the Ethylene Polymer on the one lamina, to place the second lamina on top thereof, and, finally, to heat the laminated structure under pressure.

In another preferred embodiment of the invention, films or tapes of the Ethylene Polymer can be interposed between two glass laminae before the laminae are subjected to heat and pressure. The laminates thus prepared are firmly bonded together and ordinarily cannot be separated without destroying at least one of the laminae.

A laminated glass structure comprising two glass laminae bonded together by use of the Ethylene Polymer as a bonding agent produces a structure highly effective as automobile safety glass. The product laminate has surprisingly high impact strength, is more resistant to temperature change than glass laminates conventionally employed in automobile windshields, and will exceed the rigid luminous transmittance requirements established for automobile windshields.

Conventional synthetic resins such as polyvinylbutyral employed in the manufacture of automobile laminated safety glass have properties requiring the use of plasticizers and anti-blocking agents with the resin. Employing the Ethylene Polymer as a bonding agent eliminates the necessity of employing such plasticizing or anti-blocking agents, thereby substantially improving the manufacture of laminated safety glass structures. Laminated glass structures, wherein two glass laminae, each lamina comprising 0.118 inch double strength window glass, are bonded together with the Ethylene Polymer having film thickness ranging from 10 to 40 mils, have been found to be particularly effective when employed as windshields in automobiles.

The following examples are presented to illustrate the advantages and objects of the invention. However, it is not intended that the invention should be limited to the specific embodiments presented therein.

EXAMPLE I

An Ethylene Copolymer employed in this and subsequent examples was prepared by the copolymerization of ethylene with methyl acrylate to produce a copolymer containing 20 percent methyl acrylate and by treating the copolymer so produced with a mixture of ammonium hydroxide and sodium hydroxide under conditions such as to hydrolyze at least a portion of the ester groups. Typically, 20 pounds of ethylene-methyl acrylate polymer containing 20% methyl acrylate was heated in a stirred autoclave a 240° C. for six hours with a mixture comprising the following:
 Water, 90 pounds
 28% ammonium hydroxide, 12 pounds
 Sodium hydroxide, 300 grams.
The produce obtained from the stirred autoclave was an aqueous emulsion of the Ethylene Polymer.

The Ethylene Polymer of the aqueous emulsion was coagulated by the addition of sulfuric acid, washed with water and the coagulated powder pressed into heavy-gauge film at a pressure temperature between 370° to 400° F. The film was then pressed between two sheets of glass measuring 10 inches × 10 inches at about 375° F. and 4-6 tons pressure. The resulting bonded laminated glass structure has good transparent qualities and exhibited qualities of safety glass when broken.

EXAMPLE II

The Ethylene Polymer emulsion, Example I, was spread on two sheets of glass and dried at 100° C. for five minutes. The coated glass faces were placed together and the plates were heated and pressed at 375° F. The product laminated glass structure exhibited the properties required of very good safety glass.

EXAMPLE III

A film was prepared from the acid-coagulated Ethylene Polymer of Example I. Laminated glass structures were prepared employing the described film having thicknesses ranging between 10 and 20 mils by pressing the film between two sheets of double-strength window glass (thickness of 0.118 inch) at a pressing temperature of 350° F. The product laminated structures and a laminated glass structure employing polyvinyl butyral (Run 5) as a bonding agent are illustrated below in Table I.

TABLE I

| RUN | PRESSURE PSI ABSOLUTE | LAMINATE THICKNESS, INCH | EFFECTIVE FILM THICKNESS, INCH |
|---|---|---|---|
| 1 | 1000 | 0.263 | 0.027 |
| 2 | 1000 | 0.260 | 0.024 |
| 3 | 250 | 0.261 | 0.025 |
| 4 | 500 | 0.249 | 0.013 |
| 5 | 250 | 0.264 | 0.028 |

The laminated glass structure produced in Runs 1, 2, and 5 were subjected to an impact test wherein a ½ pound steel ball was dropped a distance of 30 feet onto the structures. None of the laminated structures broke into separate pieces. The area of plastic resin which was exposed for each sample is illustrated below in Table II.

TABLE II

| RUN | AREA OF RESIN EXPOSED, SQUARE INCH |
|---|---|
| 1 | 0.78 |
| 2 | 0.52 |
| 5 | 1.77 |

The American Standards Association specification requires that no more than one square inch of reinforcing material be exposed and that the laminates should not separate into large pieces. Comparison of the results illustrated above clearly established the superiority of the laminated structures employing the Ethylene Polymer as a bonding agent as measured by impact strength when compared to the results obtained when utilizing polyvinyl butyral as a bonding agent.

EXAMPLE IV

The laminated glass structures produced in Runs 3 and 4 of Example III were placed in boiling water for a period of two hours and ten minutes. The glass laminates gave no evidence of edge discoloration, or delamination, illustrating that the laminated glass structures produced by the invention will successfully withstand exposure to tropical conditions without deterioration over an extended period of time.

EXAMPLE V

Light transmission was determined on a 2"×2"×0.015" sample of Ethylene Polymer film laminated between ⅛" glass plates. The Ethylene Polymer film employed was that prepared from the acid-coagulated Ethylene Polymer of Example I. The light transmission was 83%. This compares favorable with a light transmission of 70% required to meet the American Standard Safety Code for safety glazing materials to be employed in automobile windshields, established by the American Standards Association.

EXAMPLE VI

The acid-coagulated Ethylene Polymer of Example I and the film produced from the acid-coagulated Ethylene Polymer of Example I were employed as bonding agents in the preparation of glass laminates. The glass laminates were prepared by using in each run two sheets of 0.118 inch window-grade glass and the polymer form illustrated below in Table III. The glass laminates were heated under pressure at a temperature of 350° F. for a period of five minutes. The glass empolyed in making the laminates had been preheated to 250° F. to avoid thermal shock. The product laminates are presented below in Table III.

TABLE III

| CONTROL RUN | POLYMER FORM | PRESSURE, PSI ABSOLUTE | POLYMER THICKNESS |
|---|---|---|---|
| 6 | Powder | 500 | 0.022" |
| 7 | Sheet | 500 | 0.022" |

The laminates produced in Run 6 and 7 are were examined for light transmission on a Cary Spectrophotometer, with light transmission examined over the visible portion of the spectrum: 4000 to 7000 Angstrom units. Following this, the laminates plus a double glass (with no polymer as a control) were exposed to 100 hours of weatherometer irradiation (American Standard Safety Code test 5.1)–laminates were exposed at 110° to 124° F., 9" from arc operating at ~15 amps, 130 volts. After exposure, light transmission was again examined and results tabulated below in Table IV.

| Run No. | Sample Transmission at 4000 Angstroms | 5000 A | 6000 A | 7000 A |
|---|---|---|---|---|
| 6 Before | 77.3% | 85.7% | 85.3% | 80.5% |
| 6 After | 77.6% | 84.3% | 83.2% | 77.8% |
| Change | +0.3 | −1.4 | −2.1 | −2.7 |
| 7 Before | 65.9% | 79.1% | 81.3% | 78.5% |
| 7 After | 69.9% | 80.2% | 82.0% | 78.5% |
| Change | +4.0 | +1.1 | +0.7 | None |
| Control Before | 83.2% | 83.8% | 79.4% | 75.9% |
| Control After | 79.8% | 81.1% | 78.3% | 72.1% |
| Change | −3.4 | −2.7 | −1.1 | −3.8 |

From the examination of the above results, it is clear that no significant decrease in light transmission results after exposure to 100 hours of weatherometer irradiation, thereby establishing that the laminated glass structure will successfully withstand exposure to simulated weather conditions over an extended period of time.

EXAMPLE VII

An Ethylene Polymer was prepared by hydrolyzing an ethylene-ethyl acrylate copolymer containing 24.5 weight percent ethyl acrylate with a mixture of potassium hydroxide and ammonium hydroxide under conditions so as to convert 26 mol percent of the ester groups to the potassium salt form, the remaining ester groups being distributed between acid ester and amide groups.

The Ethylene Polymer obtained as an aqueous emulsion by the above hydrolysis was coagulated with diluted sulfuric acid. A bonded glass laminate having a thickness of 250 mils prepared by placing the powdered Ethylene Polymer between two sheets of 0.118 double-strength window glass and pressing the laminate at 300 psi and 350° F.

A ⅛ lb. steel ball was dropped from a height of 30 feet onto the laminate. The area where glass was broken free from the Ethylene Polymer measured 0.6 sq. in. This demonstrated resistance to impact establishes the effectiveness of the Ethylene Polymer in the manufacture of a safety glass.

Although the invention has been described with reference to specific materials, embodiments and details, various modifications, within the invention, will be apparent to one skilled in the art and are contemplated to be embraced within the invention.

What is claimed is:

1. A laminated glass structure comprising a pair of glass sheets bonded together with an ethylene polymer containing therein recurring units of the structure

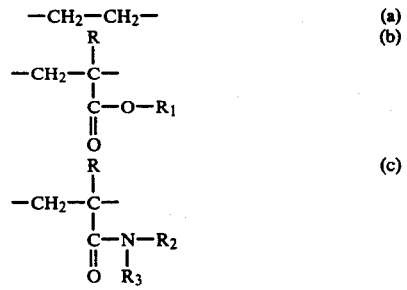

and optionally units of the structure

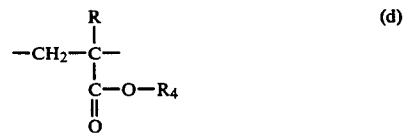

wherein R is selected from the group consisting of hydrogen and alkyl groups, $R_1$ is hydrogen, $R_2$ and $R_3$ are hydrogen, and $R_4$ is an alkyl group, the combined total of said units of the formulae (b), (c) and (d) being present in a ratio from about 0.025 to about 0.25 mole per mole of unit (a); said units (b) constituting at least 10 mole % of the total of units (b), (c) and (d); said ethylene polymer being further characterized in having the units (a), (b), (c) and (d) substantially uniformly distributed throughout the polymer chains.

2. A method for preparing a laminated glass structure which comprises (1) assembling a pair of glass sheets in superimposed relationship, at least one of the imposed glass surfaces bearing a coating of an ethylene polymer containing therein recurring units of the structure

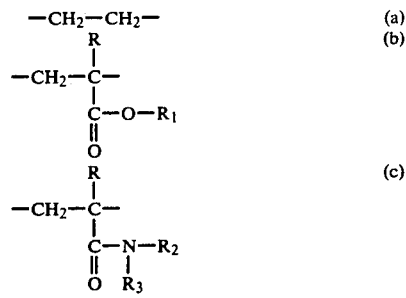

and optionally units of the structure

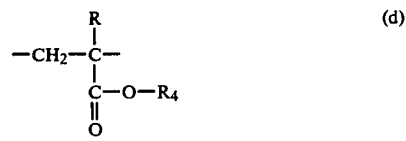

wherein R is selected from the group consisting of hydrogen and alkyl groups, $R_1$ is hydrogen, $R_2$ and $R_3$ are hydrogen and $R_4$ is an alkyl group, the total of said units of the formulae (b), (c) and (d) being present in a ratio from about 0.025 to about 0.25 mole per mole of units (a), said units (b) constituting at least 10 mole % of the total of units (b), (c) and (d); said ethylene polymer being characterized in having the units (a), (b), (c) and (d) substantially uniformly distributed throughout the polymer chains, and (2) heating said assembly under pressure to bond said laminae together.

3. A method for preparing a laminated glass structure which comprises
   (1) assembling a pair of glass sheets in superimposed relationship,
   (2) positioning solid particles of an ethylene polymer between adjacent surfaces of said glass laminae pair, said ethylene polymer containing therein recurring units of the structure

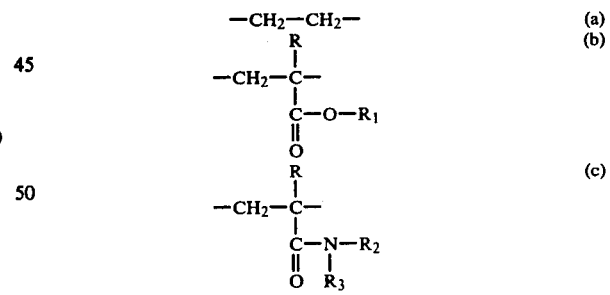

and optionally units of the structure

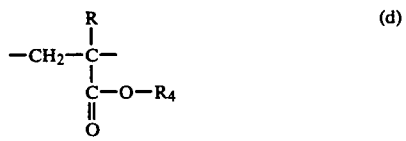

wherein R is selected from the group consisting of hydrogen and alkyl groups, $R_1$ is hydrogen, $R_2$ and $R_3$ are hydrogen, and $R_4$ is an alkyl group, the total of said units of the formulae (b), (c) and (d) being present in a ratio from about 0.025 to about 0.25 mole per mole of unit (a), said units (b) constituting at least 10 mole % of the total of units (b), (c) and (d); said ethylene polymer being further characterized in having the units (a), (b), (c) and (d) substantially uniformly distributed throughout the polymer chains, and (3) heating said assembly under pressure to bond said glass laminae together.

4. A method for preparing a laminated glass structure which comprises
(1) assembling a pair of glass sheets in superimposed relationship,
(2) positioning a film of an ethylene polymer between adjacent surfaces of said pair of glass sheets, said ethylene polymer containing therein recurring units of the structure $$-CH_2-CH_2- \quad (a)$$

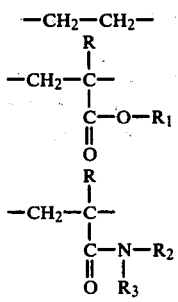

and optionally units of the structure

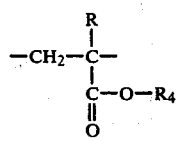

wherein R is selected from the group consisting of hydrogen and alkyl groups, $R_1$ is hydrogen, $R_2$ and $R_3$ are hydrogen, and $R_4$ is an alkyl group, the combined total of said units of the formulae (b), (c) and (d) being present in a ratio from about 0.025 to about 0.25 mole per mole of unit (a), said units (B) constituting at least 10 mole % of the total of units (b), (c) and (d); said ethylene polymer being further characterized in having the units (a), (b), (c), and (d) substantially uniformly distributed throughout the polymer chains, and (3) heating said assembly under pressure to bond said laminae together.

5. An automobile windshield fabricated from two glass sheets bonded together with an ethylene polymer containing therein recurring units of the structure $$-CH_2-CH_2- \quad (a)$$

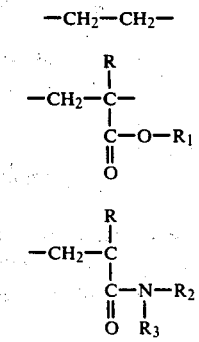

and optionally units of the structure

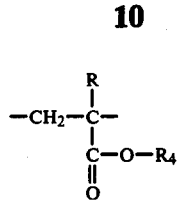

wherein R is selected from the group consisting of hydrogen and alkyl groups, $R_1$ is hydrogen, $R_2$ and $R_3$ are hydrogen, and $R_4$ is an alkyl group, the combined total of said units of the formulae (b), (c), and (d) being present in a ratio from about 0.025 to about 0.25 mole per mole of unit (a), said units (b) constituting at least 10 mole % of the total of units (b), (c) and (d); said ethylene polymer being further characterized in having the units (a), (b), (c), and (d) substantially uniformly distributed throughout the polymer chains.

6. The glass laminated structure of claim 1 wherein said two glass sheets each have a thickness of about 0.118 inch and said ethylene polymer has a thickness in the range of 10 to 40 mils.

7. A laminated glass structure comprising a pair of glass sheets bonded together with an ethylene polymer containing therein recurring units of the structure $$-CH_2-CH_2- \quad (a)$$

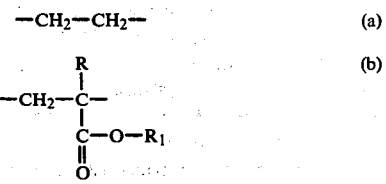

and optionally units of the structure

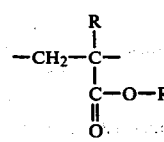

and/or

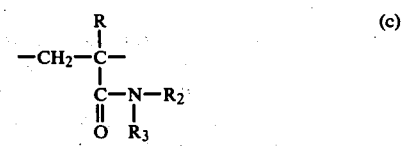

wherein R is selected from the group consisting of hydrogen and alkyl groups, $R_1$ is hydrogen, $R_2$ and $R_3$ are hydrogen, and $R_4$ is an alkyl group, the total of said units of the formulae (b), (c) and (d) being present in a ratio from about 0.04 to about 0.15 mole per mole of unit (a), said units (b) constituting at least 10 mole % of the total of units (b), (c) and (d); said ethylene polymer being further characterized in having the units (a), (b), (c) and (d) substantially uniformly distributed throughout the polymer chains.

8. A method for preparing a laminated glass structure which comprises
(1) assembling a pair of glass sheets in superimposed relationship, at least one of the imposed glass surfaces bearing a coating of an ethylene polymer containing therein recurring units of the structure $$-CH_2-CH_2- \quad (a)$$

-continued

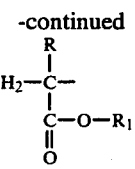

and optionally units of the structure

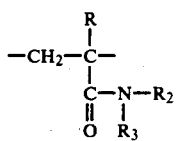

and/or

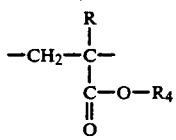

wherein R is selected from the group consisting of hydrogen and alkyl groups, $R_1$ is hydrogen, $R_2$ and $R_3$ are hydrogen, and $R_4$ is an alkyl group, the combined total of said units of the formulae (b), (c) and (d) being present in a ratio from about 0.04 to about 0.15 mole per mole of unit (a), said units (b) constituting at least 10 mole % of the total of units (b), (c) and (d); said ethylene polymer being further characterized in having the units (a), (b), (c) and (d) substantially uniformly distributed throughout the polymer chains, and (2) heating said assembly under pressure to bond said laminae together.

9. A method for preparing a laminated glass structure which comprises (1) assembling a pair of glass sheets in superimposed relationship, (2) positioning solid particles of an ethylene polymer between adjacent surfaces of said pair of glass sheets, said ethylene polymer containing therein recurring units of the structure

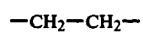 (a)

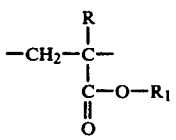 (b)

and optionally units of the structure

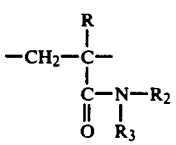 (c)

and/or

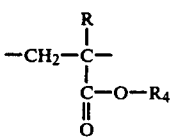 (d)

wherein R is selected from the group consisting of hydrogen and alkyl groups, $R_1$ is hydrogen, $R_2$ and $R_3$ are hydrogen, and $R_4$ is an alkyl group, the combined total of units of the formulae (b), (c), and (d) being present in a ratio from about 0.04 to about 0.15 mole per mole of unit (a), said units (b) constituting at least 10 mole % of the total of units (b), and (c) and (d); said ethylene polymer being further characterized in having the units (a), (b), (c) and (d) substantially uniformly distributed throughout the polymer chains, and (3) heating said assembly under pressure to bond said laminae together.

10. A method for preparing a laminated glass structure which comprises (1) assembling a pair of glass sheets in superimposed relationship, (2) positioning a film of an ethylene polymer between adjacent surfaces of said pair of glass sheets, said ethylene polymer containing therein recurring units of the structure

 (a)

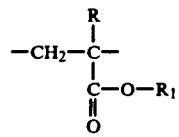 (b)

and optionally units of the structure

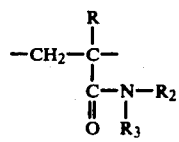 (c)

and/or

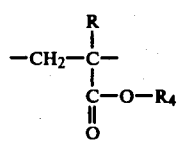 (d)

wherein R is selected from the group consisting of hydrogen and alkyl groups, $R_1$ is hydrogen, $R_2$ and $R_3$ are hydrogen, and $R_4$ is an alkyl group, the combined total of units of the formulae (b), (c) and (d) being present in a ratio from about 0.04 to about 0.15 mole per mole of unit (a), said units (b) constituting at least 10 mole % of the total of units (b), (c) and (d); said ethylene polymer being further characterized in having the units (a), (b), (c) and (d) substantially uniformly distributed throughout the polymer chains, and (3) heating said assembly under pressure to bond said laminae together.

11. An automobile windshield fabricated from two glass sheets bonded together with an ethylene polymer containing therein recurring units of the structure

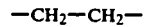 (a)

-continued

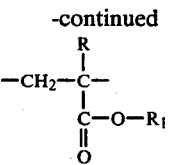 (b)

and optionally units of the structure

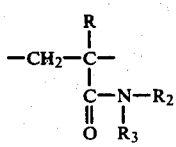 (c)

and/or

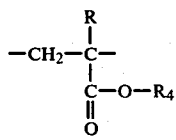 (d)

wherein R is selected from the group consisting of hydrogen and alkyl groups, $R_1$ is hydrogen, $R_2$ and $R_3$ are hydrogen, and $R_4$ is an alkyl group, the combined total of said units of the formulae (b) (c) and (d) being present in a ratio from about 0.04 to about 0.15 mole per mole of unit (a), said units (b) constituting at least 10 mole % of the total of units (b), (c) and (d); said ethylene polymer being further characterized in having the units (a), (b), (c) and (d) substantially uniformly distributed throughout the polymer chains.

12. A laminated glass structure comprising a pair of glass sheets bonded together with an ethylene polymer containing therein recurring units of the structure $$-CH_2-CH_2-$$ (a)

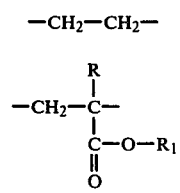 (b)

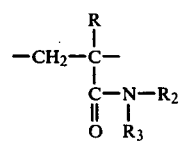 (c)

and optionally units of the structure

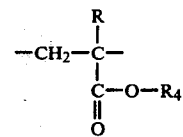 (d)

wherein R is selected from the group consisting of hydrogen and alkyl groups, $R_1$ is hydrogen, $R_2$ and $R_3$ are hydrogen, and $R_4$ is an alkyl group, the total of said units of the formulae (b), (c) and (d) being present in a ratio from about 0.04 to about 0.15 mole per mole of unit (a), said units (b) constituting at least 10 mole % of the total of units (b), (c) and (d); said ethylene polymer being further characterized in having the units (a), (b), (c) and (d) substantially uniformly distributed throughout the polymer chains.

13. An automobile windshield fabricated from two glass sheets bonded together with an ethylene polymer containing therein recurring units of the structure $$-CH_2-CH_2-$$ (a)

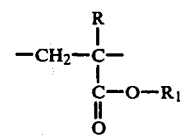 (b)

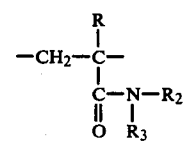 (c)

and optionally units of the structure

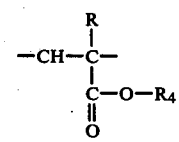 (d)

wherein R is selected from the group consisting of hydrogen and alkyl groups, $R_1$ is hydrogen, $R_2$ and $R_3$ are hydrogen, and $R_4$ is an alkyl group, the total of said units of the formulae (b), (c) and (d) being present in a ratio from about 0.04 to about 0.15 mole per mole of unit (a), said units (b) constituting at least 10 mole % of the total of units (b), (c), and (d); said ethylene polymer being further characterized in having the units (a), (b), (c) and (d) substantially uniformly distributed throughout the polymer chains.

* * * * *